(12) United States Patent
McConnell et al.

(10) Patent No.: US 10,443,768 B1
(45) Date of Patent: *Oct. 15, 2019

(54) VACUUM HOSE-PIPE ADAPTER (71) Applicant: 1NV3NT LLC, Hollywood, FL (US)

(72) Inventors: Christopher P. McConnell, Cooper City, FL (US); Joseph V. Alcure, Cooper City, FL (US)

(73) Assignee: 1NV3NT LLC, Hollywood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,327

(22) Filed: Jun. 19, 2019

Related U.S. Application Data (63) Continuation of application No. 16/396,612, filed on Apr. 26, 2019.

(51) Int. Cl.
| | |
|---|---|
| *F16L 25/14* | (2006.01) |
| *F16L 37/04* | (2006.01) |
| *A47L 9/24* | (2006.01) |
| *F16L 21/00* | (2006.01) |

(52) U.S. Cl.
CPC .............. *F16L 25/14* (2013.01); *A47L 9/242* (2013.01); *F16L 21/005* (2013.01); *F16L 37/04* (2013.01)

(58) Field of Classification Search
CPC ....................................... F16L 25/14
USPC ......... 285/148.23, 148.22, 12, 15, 148.27, 7
See application file for complete search history.

(56) References Cited

U.S. PATENT DOCUMENTS

| 980,245 | A | | 1/1911 | Goodall | |
|---|---|---|---|---|---|
| 1,801,171 | A | | 4/1931 | Mueller et al. | |
| 3,148,895 | A | | 9/1964 | Jasper et al. | |
| 3,680,896 | A | * | 8/1972 | Cupit | E03D 11/17 285/148.23 |
| 3,998,478 | A | | 12/1976 | Zopfi | |
| 4,131,441 | A | * | 12/1978 | Randall | B01D 46/00 454/147 |
| 4,266,813 | A | * | 5/1981 | Oliver | F16L 25/14 285/12 |
| 4,318,547 | A | | 3/1982 | Ericson | |
| 4,580,816 | A | | 4/1986 | Campbell et al. | |
| 4,779,904 | A | | 10/1988 | Rich | |
| 5,143,408 | A | | 9/1992 | Holtsmark | |
| 5,201,553 | A | | 4/1993 | Grisham | |
| 6,394,505 | B1 | * | 5/2002 | Schmucki | E03D 11/16 277/607 |

(Continued)

*Primary Examiner* — Aaron M Dunwoody
(74) *Attorney, Agent, or Firm* — Mark C. Johnson; Johnson |Dalal (57) ABSTRACT

A vacuum hose-pipe adapter that includes a sidewall bifurcated into two portions, wherein the first portion includes a first distal terminal end defining a distal pipe opening a first portion length separating a first proximal end and the first distal terminal end, and a sidewall inner surface of a frustro-pyramidal shape and enclosed configuration tapering in diameter from the distal pipe opening along the first portion length and the second portion with a second distal terminal end opposing the first distal terminal end and defining a distal hose opening, with a recessed bottom wall, with a sidewall inner surface enclosing and defining a first a first hose diameter, and with a second hose sidewall projecting from the recessed bottom wall, toward the distal hose opening, and enclosing and defining a second hose diameter less than the first hose diameter, thereby allowing fluid to flow therein and between the openings.

17 Claims, 6 Drawing Sheets

(56) References Cited

U.S. PATENT DOCUMENTS

| | | | |
|---|---|---|---|
| 7,007,720 B1* | 3/2006 | Chase | F16L 59/12 |
| | | | 138/110 |
| 7,350,824 B2* | 4/2008 | Petner | E03C 1/304 |
| | | | 15/353 |
| 7,617,566 B2* | 11/2009 | Chapman | A47L 9/02 |
| | | | 15/344 |
| 7,685,766 B2* | 3/2010 | Amsellem | A01G 29/00 |
| | | | 47/48.5 |
| 7,708,714 B2* | 5/2010 | Connell | A61M 1/285 |
| | | | 604/30 |
| 8,113,543 B1* | 2/2012 | Romani | A01K 13/001 |
| | | | 15/419 |
| 8,444,188 B2 | 5/2013 | Pucciani | |
| 9,022,429 B2 | 5/2015 | Heindl | |
| 9,752,712 B2 | 9/2017 | Farland et al. | |
| 9,803,343 B2* | 10/2017 | Montoya | E03C 1/0404 |
| 10,278,555 B2* | 5/2019 | Rupp | A47L 5/365 |
| 2009/0250922 A1* | 10/2009 | Rossman | F16L 25/14 |
| | | | 285/24 |
| 2013/0092275 A1 | 4/2013 | Charlson et al. | |
| 2014/0062077 A1* | 3/2014 | Hurley | F24F 13/222 |
| | | | 285/7 |
| 2015/0198274 A1* | 7/2015 | Farland | F16L 25/14 |
| | | | 285/7 |
| 2016/0319521 A1* | 11/2016 | Mitchell | E03B 1/042 |

* cited by examiner

VACUUM HOSE-PIPE ADAPTER

FIELD OF THE INVENTION

The present invention relates generally to adapters configured for use with pipes, and, more particularly, relates to adapters configured for use with pipes and hoses.

BACKGROUND OF THE INVENTION

Whether in hot or cool climates, air conditioning ("A/C") units are routinely utilized by consumers in their homes. Part of maintaining and/or repairing A/C units includes draining or otherwise removing condensation from inside a condensation pipe operably and fluidly coupled to the air handler. The condensation pipe is typically of a polyvinyl chloride (PVC) or ABS plastic material and, if clogged (usually from algae, mold, or milder), can cause water damage inside the house and to the A/C unit. Some methods of preventing and/or removing clogs or debris from condensation pipes include pouring a cup of bleach or chemical into the condensation pipe from the inside of a user's home or, more effectively, attach an end of a wet/dry vacuum to a PVC drain line outside the home or inside the home and inducing a vacuum to suck the clog or debris out. Usually, the drain will have a T-shaped vent with a PVC cover, wherein the cover will need to be removed before evacuation of the clog or debris. While a wet/dry vacuum works best to remove clogs and debris, some users attach additional tubing to suck the debris out manually. However, this method can be a safety issue for the user.

To make the debris or clog removal more effective, a tight seal between the pipe defining the opening and the distal end of the hose are important. This is chiefly because any loose coupling connection can negatively affect the negative pressure induced by the vacuum. There are known conduit adapters available in the marketplace. As those of skill in the art will appreciate, fittings and conduit connectors have actually been available for over a hundred years. That said, none of those known fittings or adapters are configured and sized to efficiently, effectively, and easily couple with a various different pipe and hose diameters associated with A/C units, and employed by those who maintain and/or repair them. As such, much time and expense are spent trying effectively couple a hose end with a pipe to minimize negative pressure losses.

Therefore, a need exists to overcome the problems with the prior art as discussed above.

SUMMARY OF THE INVENTION

The invention provides a vacuum-hose adapter that overcomes the hereinafore-mentioned disadvantages of the heretofore-known devices and methods of this general type and that can effectively and efficiently couple with a various different pipe and hose diameters associated with A/C units. As such, the present invention enables those individuals who repair or maintain said A/C units to have a single adapter that can effectively reach and maintain a negative pressure induced by the vacuum.

With the foregoing and other objects in view, there is provided, in accordance with the invention, a vacuum hose-pipe adapter having a unitary adapter body with a sidewall bifurcated into a first portion and a second portion. The first portion includes a first proximal end, a first distal terminal end defining a distal pipe opening, a first portion length separating the first proximal end and the first distal terminal end, and a sidewall inner surface of a frustro-pyramidal shape and enclosed configuration tapering in diameter from the distal pipe opening along the first portion length. The second portion has a second proximal end, a second distal terminal end, opposing the first distal terminal end, and defines a distal hose opening, has a recessed bottom wall, has a sidewall inner surface enclosing and defining a first hose diameter, and has a second hose sidewall projecting from the recessed bottom wall, toward the distal hose opening, and enclosing and defining a second hose diameter less than the first hose diameter. The distal pipe opening is opposite the distal hose opening and fluidly coupled to one another through a body channel separating the distal pipe and distal hose openings.

In accordance with a further feature of the present invention, the sidewall of the second portion that defines the first hose diameter and the second hose sidewall are disposed in a concentric configuration with respect to one another.

In accordance with an additional feature of the present invention, the sidewall of the second portion that defines the first hose diameter and the second hose sidewall are disposed in a concentric configuration with respect to one another. The sidewall of the second portion may also define the first hose diameter and the second hose sidewall are continuous and circular.

In accordance with yet another feature of the present invention, the sidewall of the second portion that defines the first hose diameter and the second hose sidewall each flank and define a first hose channel of a circular shape.

In accordance with another feature, an embodiment of the present invention includes the second portion of the unitary adapter body having a third hose sidewall projecting from the recessed bottom wall, toward the distal hose opening, and enclosing a third hose diameter less than the first and second hose diameters.

In accordance with a further feature of the present invention, the sidewall of the second portion that defines the first hose diameter, the second hose sidewall, and the third hose sidewall are disposed in a substantially parallel orientation with respect to one another. Additionally, the sidewall of the second portion defining the first hose diameter, the second hose sidewall, and the third hose sidewall are disposed in a concentric configuration with respect to one another. Further, the sidewall of the second portion defining the first hose diameter, the second hose sidewall, and the third hose sidewall may be continuous and circular.

In accordance with an exemplary feature of the present invention, the sidewall of the second portion defining the first hose diameter and the second hose sidewall flank and define a first hose channel of a circular shape and wherein the second hose sidewall and the third hose sidewall each flank and define a second hose channel of a circular shape, the first hose channel and the second hose channel of a substantially uniform shape.

In accordance with yet another feature, an embodiment of the present invention also includes the third hose sidewall having an inner surface, wherein the bottom wall and the inner surface define a hose seat of a circular shape.

In accordance with a further feature of the present invention the sidewall inner surface of the frustro-pyramidal shape and enclosed configuration defines at least three cascading tapering diameters concentrically configured with respect to one another.

In accordance with an additional feature of the present invention, the sidewall inner surface of the frustro-pyramidal shape and enclosed configuration defines five cascading tapering diameters concentrically configured with respect to one another and of a circular shape.

In accordance with yet another feature of the present invention, the unitary adapter body is of a polymeric elastomer.

Also in accordance with the present invention, a vacuum hose-pipe adapter is disclosed that includes a unitary adapter body having a sidewall bifurcated into two portions. A first portion may include a first proximal end, a first distal terminal end defining a distal pipe opening a first portion length separating the first proximal end and the first distal terminal end, and a sidewall inner surface defining and enclosing at least three stepped, cascading, and circular sidewall sections each defining tapering diameters concentrically configured with respect to one another from the distal pipe opening along the first portion length. A second section may include a second proximal end, a second distal terminal end opposing the first distal terminal end and defining a distal hose opening, with a recessed bottom wall, with a sidewall inner surface enclosing and defining a first hose diameter, and with a second hose sidewall projecting from the recessed bottom wall, toward the distal hose opening, and enclosing and defining a second hose diameter less than the first hose diameter. The distal pipe opening is opposite the distal hose opening and fluidly coupled to one another through a body channel separating the distal pipe and distal hose openings.

Although the invention is illustrated and described herein as embodied in a vacuum hose-pipe adapter, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the adapter, or to and from the opposing openings on the adapter.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
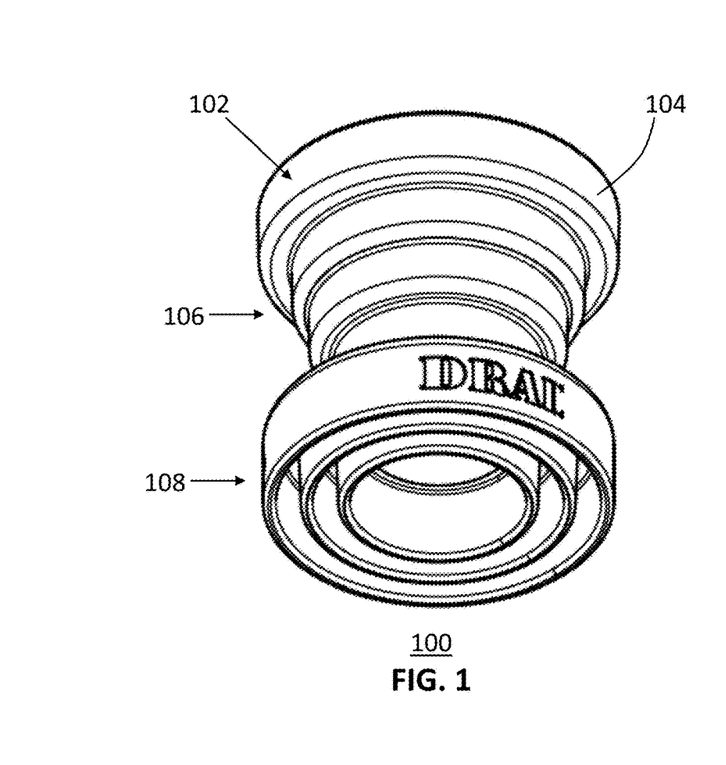
FIG. 1 is a perspective view of a vacuum hose-pipe adapter in accordance with one embodiment of the present invention.
Figure 2:
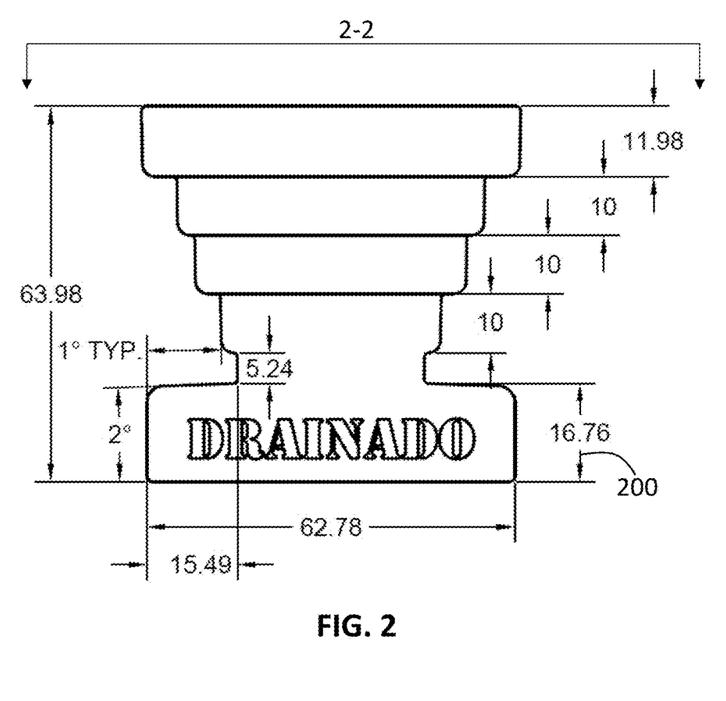
FIG. 2 is an elevational view the vacuum hose-pipe adapter depicted in FIG. 1.
Figure 3:
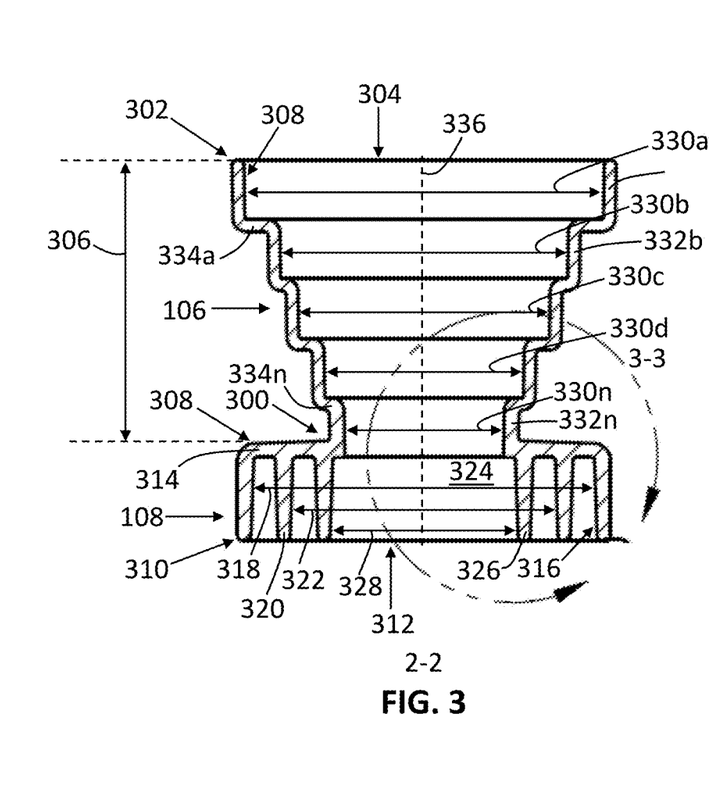
FIG. 3 is a cross-sectional view of the vacuum hose-pipe adapter depicted in FIG. 2 along section line 2-2.

The present invention provides a novel and efficient vacuum hose-pipe adapter specially configured and sized, based in party on research and experience in the A/C industry, that can effectively couple with a differently sized pipe and hose end diameters. Referring now to FIG. 1-3, one embodiment of the present invention is shown in a perspective, elevational and cross-sectional view, respectively. The figures show several advantageous features of the present invention, but, as will be described below, the invention can be provided in several shapes, sizes, combinations of features and components, and varying numbers and functions of the components. The first example of the vacuum hose-pipe adapter 100, as shown in the figures, includes a unitary adapter body 102 having a sidewall 104 bifurcated into two sections, i.e., a pipe adapter portion 106 (also referred to herein as a "first portion") and a hose adapter portion 108 (also referred to herein as a "second portion"). The adapter body 102 is unitary in that the portions 106, 108 or section are undivided and act as a single piece. As used herein, the term "wall" is intended broadly to encompass continuous structures, as well as, separate structures that are coupled together to form a substantially continuous external surface.

Figures 15, 16:
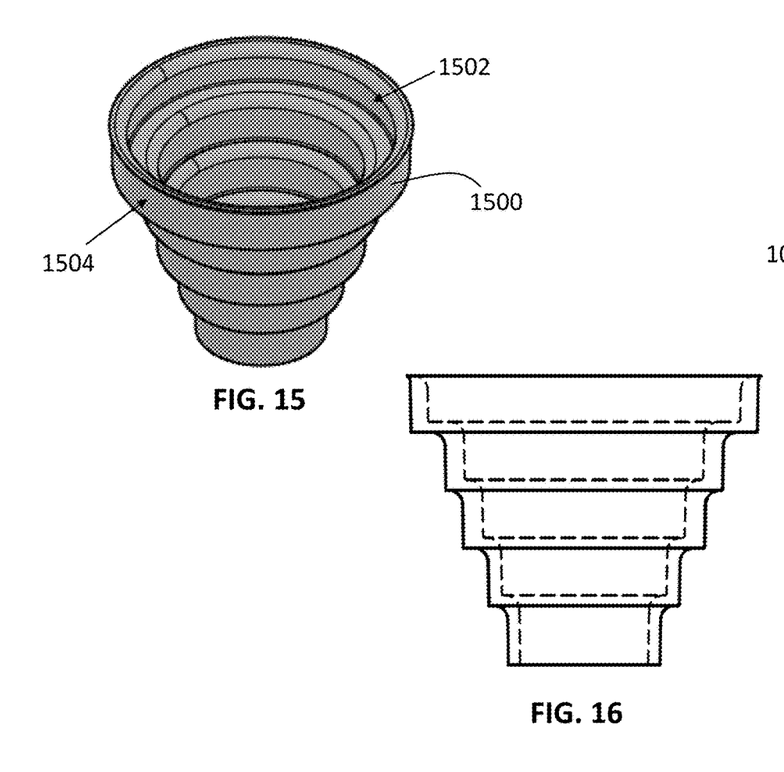
FIG. 15 is a perspective view of an adapter body insert in accordance with one embodiment of the present invention.
FIG. 16 is a cross-sectional view of the adapter body insert depicted in FIG. 15.
Figure 17:
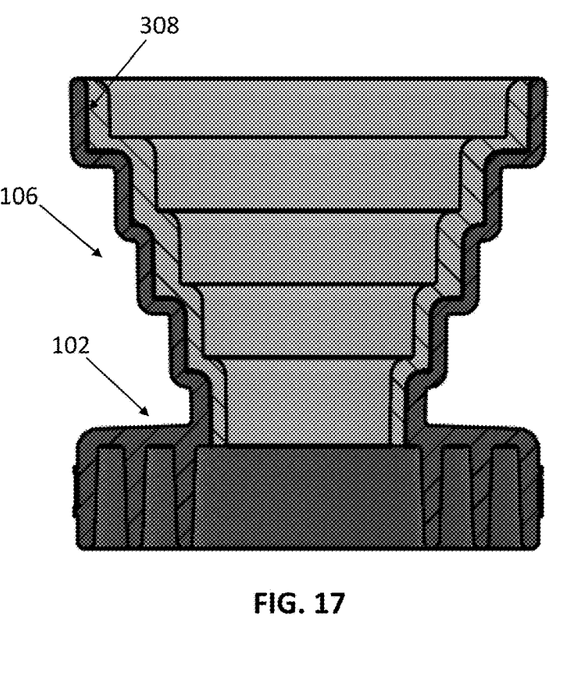
FIG. 17 is a cross-sectional view of the adapter body insert depicted in FIG. 15 coupled within an adapter body in accordance with one embodiment of the present invention.

In one and preferred embodiment the adapter body 102 is injection molded from a polymeric material that is flexible when cured or set. As such, the adapter 100 is effectively enabled to flex, and effectively retain and couple with after flexed, to accommodate pipe and hose ends without plastic deformation in the adapter body 102. To effectuate the same, it has been found that a copolyester material, that is preferably an elastomer and/or a thermoplastic elastomer, works best. In one embodiment, the adapter body 102, or the adapter body insert 1500 as depicted in FIGS. 15-17, is of a thermoplastic elastomer (TPE) made by DUPONT® under the commercial name HYTREL® 3078 or 7246 or under the commercial name KINGSELAST™ 8607A-60N01. In particular, the adapter body 102 may have a yield stress of 25-30 MPa, yield strain of approximately 22-24%, a Poisson's ratio of approximately 0.45-0.5, and a hardness of approximately 10-68 Shore D or 65-100 Shore A. The portions 106, 108 may also be independently manufactured and joined or coupled together using fasteners or adhesive. However, other flexible materials (e.g., thermoplastic polyurethane (TPU) or acrylonitrile butadiene styrene (ABS)), material properties, and methods of manufacturing, e.g., thermoforming, casting, etc., may be employed and/or utilized. Additionally, additives or colorings may also be utilized to provide a durable piece that can be repeatedly used by individuals maintaining or repairing A/C units. Moreover, exemplary dimensions are also depicted in the figures (in millimeters) for effectuating secure and effective coupling of the adapter body 102 to a pipe or hose end (which are generally of polymeric materials configured for slight or moderate flexing without plastic deformation).

Referring back to FIGS. 1-3, the first portion 106 of the body 102 configured to couple with a pipe end includes a first proximal end 300, a first distal terminal end 302, and a first portion length 306 separating the first proximal end 300 and the first distal terminal end 302. The first distal terminal end 302 defines a distal pipe opening 304 where pipe ends and diameters of various dimensions and sizes may be inserted therein. The first portion 106 also includes a sidewall inner surface 308 beneficially of a frustro-pyramidal shape and enclosed configuration tapering in diameter from the distal pipe opening 304 along the first portion length 306. Said another way, the inner surface 308 (and outer surface in some embodiments) of the sidewall 104 has a configuration and shape of a cone or pyramid with its tip that has been truncated by a plane parallel to its base. This can be seen with the distal end 302 representing the base and the proximal end 300 representing the truncated tip. The sidewall sections 332$a$-$n$ each defining tapering diameters 330$a$-$n$ of the first portion 106 are also depicted, wherein "n" represents any number greater than one.

Figure 6:
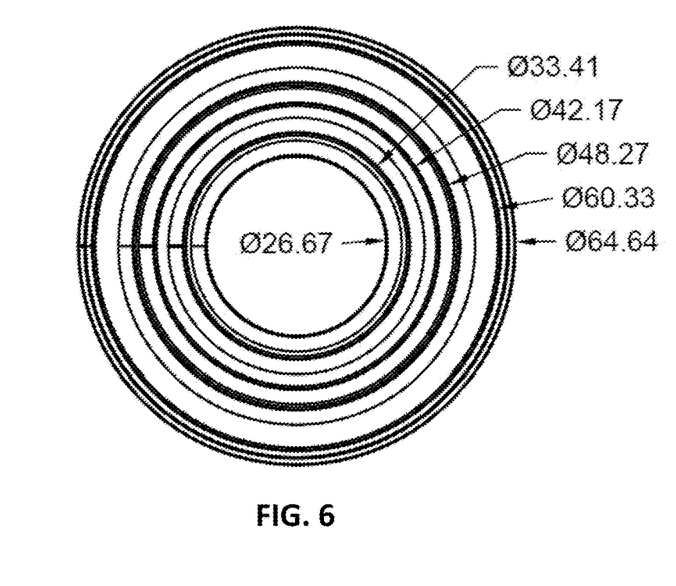
FIG. 6 is a top plan view of the vacuum hose-pipe adapter depicted in FIG. 1 and depicting the pipe adapter portion.
Figure 10:
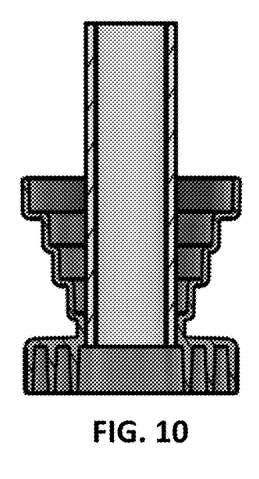
FIG. 10 is a cross-sectional view of the vacuum hose-pipe adapter depicted in FIG. 1 with a ¾ inch pipe end selectively removably coupled to the pipe adapter portion thereon.
Figure 11:
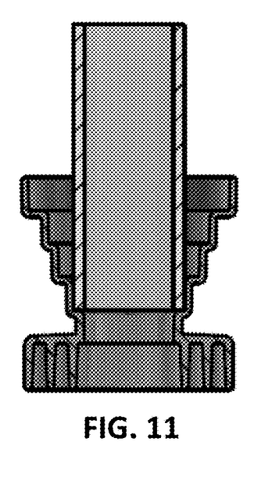
FIG. 11 is a cross-sectional view of the vacuum hose-pipe adapter depicted in FIG. 1 with a 1 inch pipe end selectively removably coupled to the pipe adapter portion thereon.
Figure 12:
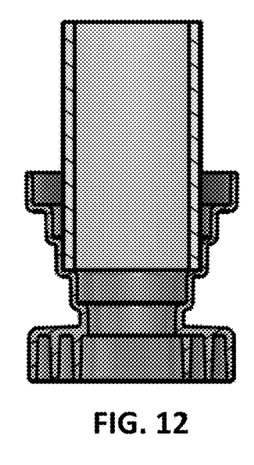
FIG. 12 is a cross-sectional view of the vacuum hose-pipe adapter depicted in FIG. 1 with a 1¼ inch pipe end selectively removably coupled to the pipe adapter portion thereon.
Figure 13:
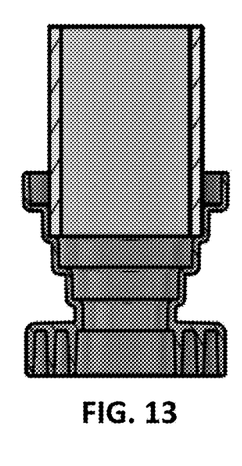
FIG. 13 is a cross-sectional view of the vacuum hose-pipe adapter depicted in FIG. 1 with a 1½ inch pipe end selectively removably coupled to the pipe adapter portion thereon.
Figure 14:
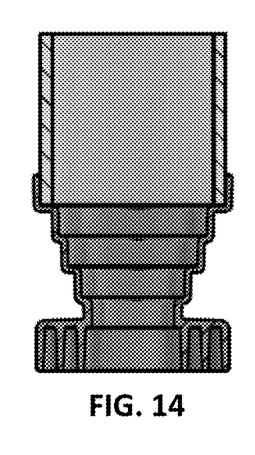
FIG. 14 is a cross-sectional view of the vacuum hose-pipe adapter depicted in FIG. 1 with a 2 inch pipe end selectively removably coupled to the pipe adapter portion thereon.

In one embodiment, the sidewall inner surface 308 of the frustro-pyramidal shape and enclosed configuration defines at least three cascading tapering diameters 330$a$-$n$ concentrically configured with respect to one another. Said another way, the sidewall sections 332$a$-$n$ defining the sidewall inner surface 308 can be seen defining the diameters 330$a$-$n$ that may be arranged or occurring in a series or in a succession after one another that continuously decrease in magnitude. Exemplary diameter dimensions can also be seen depicted in FIG. 6, which depicts a top plan view of the pipe adapter portion 106 of the adapter 100. In one embodiment, the opening 304 and first diameter 330$a$ may be equal and approximately 60.6 mm to effectively receive, and compressively and/or frictionally retain with the sidewall 332$a$, a 2 inch pipe end (schedule 40, or potentially another thickness) therein (as best seen in FIG. 14). Further, the second diameter 330$b$ may be approximately 48.6 mm to effectively receive, and compressively and/or frictionally retain with the sidewall 332$b$, a 1½ inch pipe end therein (as best seen in FIG. 13). The third diameter 330$c$ may be approximately 42.5 mm to effectively receive, and compressively and/or frictionally retain with the sidewall, a 1¼ inch pipe end therein (as best seen in FIG. 12). The fourth diameter 330$c$ may be approximately 33.7 mm to effectively receive, and compressively and/or frictionally retain with the sidewall, a 1 inch pipe end therein (as best seen in FIG. 11). The fourth diameter 330$c$ may be approximately 27 mm to effectively receive, and compressively and/or frictionally retain with the sidewall, a ¾ inch pipe end therein (as best seen in FIG. 10).

As such, the sidewall inner surface 308 of the frustropyramidal shape and enclosed configuration may advantageously define five cascading tapering diameters 330a-n concentrically configured with respect to one another and which may also be of a circular shape. Said differently, the sidewall inner surface 308 may define and enclose at least three, but preferably five, stepped, cascading, and circular sidewall sections 332a-n, wherein each of said sections 332a-n collectively define tapering diameters 330a-n concentrically configured with respect to one another from the distal pipe opening 304 along the first portion length 306. Additionally, each of the stepped, cascading, and circular sidewall sections 332a-n are annular to effectively retain pipe ends circumferentially thereon. Each of the sidewall sections 332a-n may be of a thickness of approximately 2-3 mm and can also be seen having internal seats 334a-n disposed at a substantially perpendicular orientation (90°+/−5°) with respect to one or both of adjacent sidewall sections. The internal seats 334a-n beneficially prevent pipe ends from extending passed each sidewall section. Moreover, each of the sidewall sections 332a-n may parallel to one another and may be approximately 10-12 mm in longitudinal length (as best seen in FIG. 2).

Beneficially, the second portion 108 is also specially configured to receive and retain various hose ends and diameters. To that end, the second portion 108 includes a second proximal end 308, a second distal terminal end 310, which opposes the first distal terminal end 302, a recessed bottom wall 314, and a sidewall inner surface 316 enclosing and defining a first hose diameter 318. The second distal terminal end also defining a distal hose opening operably configured to receive a distal end of the hose. The second portion 108 also beneficially includes a second hose sidewall 320 projecting from the recessed bottom wall 314, toward the distal hose opening 312, wherein the second hose sidewall 320 is disposed and configured to enclose and define a second hose diameter 322 less than the first hose diameter 318. The placement and configuration of the openings 304, 312, which are opposite to one another, enable them to effectively permit fluid, including liquid, and debris transportation therethrough. Said another way, the openings 304, 312 are fluidly coupled to one another through a body channel 324 that separates the distal pipe and distal hose openings 304, 312.

Beneficially, the second portion 108 of the unitary adapter body 102 may also include a third hose sidewall 326 projecting from the recessed bottom wall 314, and toward the distal hose opening 312, to enclose a third hose diameter 328 less than the first and second hose diameters 318, 322. In one embodiment, two or more of the sidewall 104 of the second portion 108 defining the first hose diameter 318, the second hose sidewall 320, and the third hose sidewall 326 are disposed in a concentric configuration with respect to one another. Additionally, one or more, or all, of the sidewall 104, the second hose sidewall 320, and the third hose sidewall 326 are continuous and circular. Said another way, the sidewalls 104, 320, 326 have no gaps thereon spanning from the distal and terminal tips to each respective joint or end where joined to the bottom wall 314. In other embodiments, the sidewalls 104, 320, 326 may have gaps or apertures therein to, for example, permit fluid flow or debris transportation through said sidewalls 104, 320, 326 and into a hose coupled to the adapter body 102. The sidewalls 104, 320, 326 may also be non-circular if targeting differently shaped ends of a hose.

Figure 4:
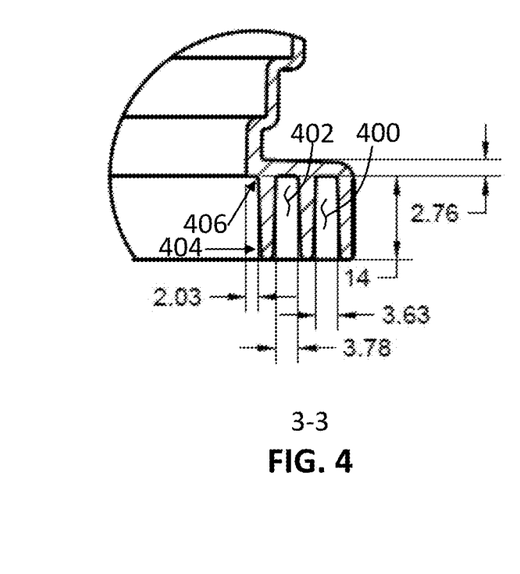
FIG. 4 is a close-up view, along section 3-3, of a hose adapter portion of the vacuum hose-pipe adapter depicted in FIG. 3.

With reference to FIGS. 3-4, each of the sidewalls 104, 320, 326 on the second portion 108 may also be disposed in a substantially perpendicular orientation with respect to the axis defined by the bottom wall 314. The sidewalls 104, 320, 326 may also be disposed in a substantially parallel orientation with respect to one another. The sidewall 104 of the second portion 108 defining the first hose diameter 318 and the second hose sidewall 320 may also each flank and define a first hose channel 400 of a circular shape. The second hose sidewall 320 and the third hose sidewall 326 may also each flank and define a second hose channel 402 that may be of a circular shape. The first hose channel 400 and the second hose channel 402 may be of a substantially uniform shape and size to effectively receive a gauge of the hose end, e.g., approximately 3.6 mm-3.8 mm (as best seen in the close-up view of FIG. 4). In preferred embodiments, to effectuate a more secure retention of the hose end, the first and second hose channels 400, 402 may taper in diameter along a portion of the longitudinal length spanning from the tips, e.g., having a distal diameter at the tips of approximately 3.8 mm and proximal diameter at the base of the channels 400, 402 of approximately 2 mm. The third hose sidewall 326 also includes an inner surface 404, wherein the bottom wall 314 and the inner surface 404 define a hose seat 406 that may also be of a circular shape.

Figure 5:
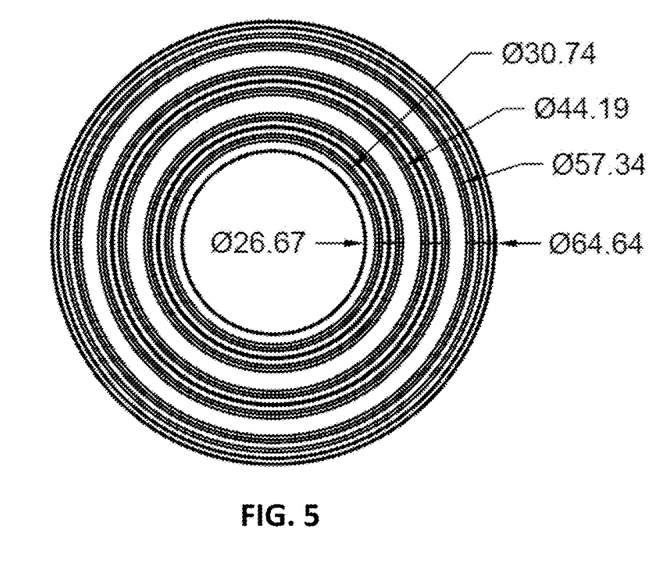
FIG. 5 is a bottom plan view of the vacuum hose-pipe adapter depicted in FIG. 1 and depicting the hose adapter portion.
Figure 7:
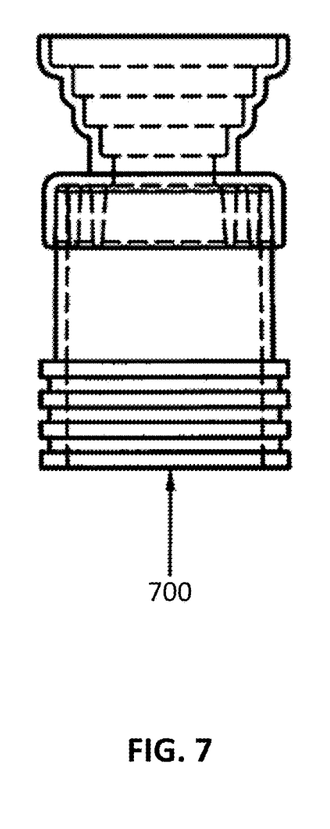
FIG. 7 is an elevational and transparent view of the vacuum hose-pipe adapter depicted in FIG. 1 with a 2½ inch vacuum hose selectively removably coupled to the hose adapter portion thereon.
Figure 8:
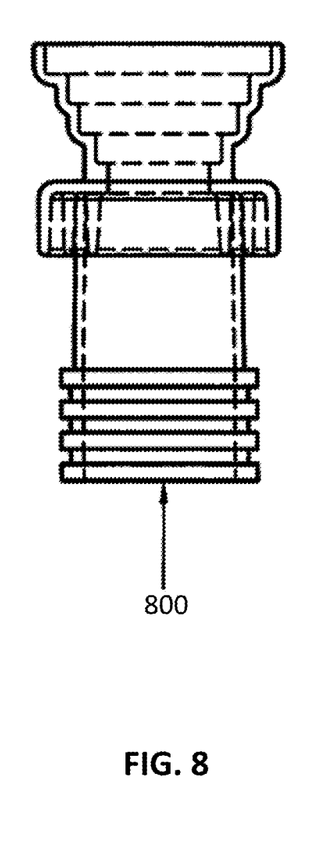
FIG. 8 is an elevational and transparent view of the vacuum hose-pipe adapter depicted in FIG. 1 with a 1⅞ inch vacuum hose selectively removably coupled the hose adapter portion thereon.
Figure 9:
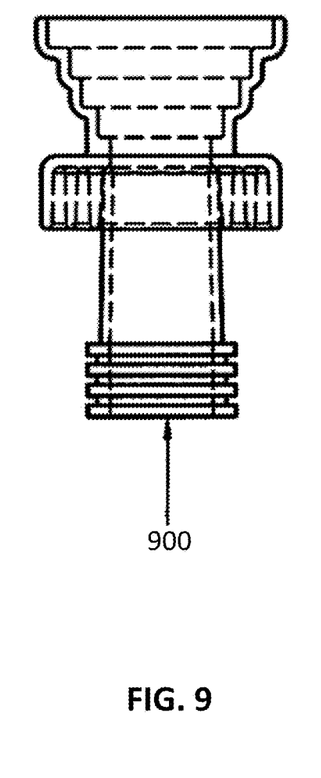
FIG. 9 is an elevational and transparent view of the vacuum hose-pipe adapter depicted in FIG. 1 with a 1¼ inch vacuum hose selectively removably coupled the hose adapter portion thereon.

Exemplary diameter dimensions of the hose adapter portion 108 of the adapter 100 can be seen depicted in FIG. 5, which depicts a top plan view of the hose adapter portion 108. In one embodiment, the opening 312 and first hose diameter 318 may be equal and approximately 57.3 mm to effectively receive, and compressively and/or frictionally retain with the sidewalls 104, 320 of the second portion 108a, a 2½ inch vacuum hose 700 therein (as best seen in FIG. 7). The second hose diameter 322 may be approximately 44.2 mm to effectively receive, and compressively and/or frictionally retain with the sidewalls 320, 326 of the second portion 108a, a 1⅞ inch vacuum hose 800 therein (as best seen in FIG. 8). The third hose diameter 322 may be approximately 30.7 mm to effectively receive, and compressively and/or frictionally retain with the sidewall 326 of the second portion 108a, a 1¼ inch vacuum hose 900 therein (as best seen in FIG. 9). Each of the sidewalls 104, 320, 326 of the second portion 108, and respective diameters, defined thereon may be annular in shape. Additionally, the diameters defined by the sidewalls 104, 320, 326 of the second portion 108 and the diameters defined by the sidewall 104 of the first portion 106 may be axially aligned and/or concentric respect to a centrally located axis 336 or centroid of the circular shapes.

In light of the above disclosure, those of skill in the art will appreciate that the adapter 100, namely the hose adapter portion 108, is configured to connect up to at least three different vacuum hose diameters, while the pipe adapter portion 106 is configured to connect with up to at least five different pipe diameters. As such, this adapter 100 beneficially provides users the ability to clear out debris and/or blockages inside pipe lines.

As best depicted in FIGS. 15-17, in combination with FIG. 3, an adapter body insert 1500 is selectively removably coupled to the sidewall inner surface 308 of the first portion 106 of the sidewall of the unitary adapter body 102. Said another way, the adapter body insert 1500 is operably configured to be inserted and removed from the distal pipe opening 304 and into the body channel 324 of the first portion 106. The adapter body insert 1500 enables the vacuum hose-pipe adapter 100 to accommodate cpvc pipes of various sizes. The adapter body insert 1500 may fit cpvc pipe sizes ranging from ¾ inches to 2 inches.

The adapter body insert 1500 includes an inner surface 1502 and an outer surface 1504 of a shape and configuration corresponding to a shape and configuration of the at least three stepped, cascading, and circular sidewall sections 332a-n of the sidewall inner surface 308 of the first portion 106 of the sidewall of the unitary adapter body 102. Therefore, a user may quickly and easily remove and insert the adapter body insert 1500 if attempting to receive and retain cpvc pipes.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A vacuum hose-pipe adapter comprising:
    a unitary adapter body having a sidewall bifurcated into:
        a first portion with a first proximal end, a first distal terminal end defining a distal pipe opening, a first portion length separating the first proximal end and the first distal terminal end, and a sidewall inner surface of a frustro-pyramidal shape and enclosed configuration tapering in diameter from the distal pipe opening along the first portion length and defining at least three cascading tapering diameters concentrically configured with respect to one another; and
        a second portion with a second proximal end, a second distal terminal end opposing the first distal terminal end and defining a distal hose opening, with a recessed bottom wall, with a sidewall inner surface enclosing and defining a first hose diameter, and with a second hose sidewall projecting from the recessed bottom wall, toward the distal hose opening, and enclosing and defining a second hose diameter less than the first hose diameter, wherein the distal pipe opening is opposite the distal hose opening and fluidly coupled to one another through a body channel separating the distal pipe and distal hose openings.

2. The vacuum hose-pipe adapter according to claim 1, wherein:
    the sidewall of the second portion defining the first hose diameter and the second hose sidewall are disposed in a concentric configuration with respect to one another.

3. The vacuum hose-pipe adapter according to claim 2, wherein:
    the sidewall of the second portion defining the first hose diameter and the second hose sidewall are continuous and circular.

4. The vacuum hose-pipe adapter according to claim 1, wherein:
    the sidewall of the second portion defining the first hose diameter and the second hose sidewall each flank and define a first hose channel of a circular shape.

5. The vacuum hose-pipe adapter according to claim 1, wherein the second portion of the unitary adapter body further comprises:
    a third hose sidewall projecting from the recessed bottom wall, toward the distal hose opening, and enclosing a third hose diameter less than the first and second hose diameters.

6. The vacuum hose-pipe adapter according to claim 5, wherein:
    the sidewall of the second portion defining the first hose diameter, the second hose sidewall, and the third hose sidewall are disposed in a substantially parallel orientation with respect to one another.

7. The vacuum hose-pipe adapter according to claim 5, wherein:
    the sidewall of the second portion defining the first hose diameter, the second hose sidewall, and the third hose sidewall are disposed in a concentric configuration with respect to one another.

8. The vacuum hose-pipe adapter according to claim 5, wherein:
    the sidewall of the second portion defining the first hose diameter, the second hose sidewall, and the third hose sidewall are continuous and circular.

9. The vacuum hose-pipe adapter according to claim 8, wherein:
    the sidewall of the second portion defining the first hose diameter and the second hose sidewall flank and define a first hose channel of a circular shape and wherein the second hose sidewall and the third hose sidewall each flank and define a second hose channel of a circular shape, the first hose channel and the second hose channel of a substantially uniform shape.

10. The vacuum hose-pipe adapter according to claim 5, wherein the third hose sidewall further comprises:
    an inner surface, wherein the bottom wall and the inner surface define a hose seat of a circular shape.

11. The vacuum hose-pipe adapter according to claim 1, wherein:
    the sidewall inner surface of the frustro-pyramidal shape and enclosed configuration defines five cascading tapering diameters concentrically configured with respect to one another and of a circular shape.

12. The vacuum hose-pipe adapter according to claim 11, wherein:
    the unitary adapter body is of a polymeric elastomer.

13. A vacuum hose-pipe adapter comprising:
    a unitary adapter body having a sidewall bifurcated into:
        a first portion with a first proximal end, a first distal terminal end defining a distal pipe opening a first portion length separating the first proximal end and the first distal terminal end, and a sidewall inner surface defining and enclosing five stepped, cascading, and circular sidewall sections each defining tapering diameters concentrically configured with respect to one another from the distal pipe opening along the first portion length; and
        a second portion with a second proximal end, a second distal terminal end opposing the first distal terminal end and defining a distal hose opening, with a recessed bottom wall, with a sidewall inner surface enclosing and defining a first hose diameter, and with a second hose sidewall projecting from the recessed bottom wall, toward the distal hose opening, and enclosing and defining a second hose diameter less than the first hose diameter, wherein the distal pipe opening is opposite the distal hose opening and fluidly coupled to one another through a body channel separating the distal pipe and distal hose openings.

14. The vacuum hose-pipe adapter according to claim 13, wherein: the five stepped, cascading, and circular sidewall sections are annular.

15. The vacuum hose-pipe adapter according to claim 14, wherein:
   the unitary adapter body is of a polymeric elastomer.

16. The vacuum hose-pipe adapter according to claim 15, wherein the second portion of the unitary adapter body further comprises:
   a third hose sidewall projecting from the recessed bottom wall, toward the distal hose opening, and enclosing a third hose diameter less than the first and second hose diameters.

17. The vacuum hose-pipe adapter according to claim 13, further comprising:
   an adapter body insert selectively removably coupled to the sidewall inner surface of the first portion of the sidewall of the unitary adapter body, the adapter body insert with an inner surface and an outer surface of a shape and configuration corresponding to a shape and configuration of the at least three stepped, cascading, and circular sidewall sections of the sidewall inner surface of the first portion of the sidewall of the unitary adapter body.

\* \* \* \* \*